United States Patent [19]

Gilmour

[11] Patent Number: 5,988,516
[45] Date of Patent: Nov. 23, 1999

[54] SOLAR HOT WATER HEATING SYSTEM

[75] Inventor: Malcolm Gilmour, Bayswater, Australia

[73] Assignee: Sola-Kleen Pty. Ltd., Bayswater, Australia

[21] Appl. No.: 09/144,791

[22] Filed: Sep. 1, 1998

Related U.S. Application Data

[62] Division of application No. 08/718,531, filed as application No. PCT/AU95/00198, Apr. 7, 1995, Pat. No. 5,836,511.

[30] Foreign Application Priority Data

Apr. 8, 1994 [AU] Australia ................... PM4933

[51] Int. Cl.$^6$ ........................................ F24H 9/20
[52] U.S. Cl. ........................... 236/46 R; 236/20 R
[58] Field of Search ..................... 236/46 R, 46 F, 236/20 R; 237/8 R, 8 A; 219/492

[56] References Cited

U.S. PATENT DOCUMENTS

| | | | |
|---|---|---|---|
| 3,979,059 | 9/1976 | Davis et al. | 236/46 R |
| 4,256,258 | 3/1981 | Sekiya . | |
| 4,508,261 | 4/1985 | Blank | 236/46 R |
| 4,522,333 | 6/1985 | Blau, Jr. et al. | 236/46 F |
| 4,529,121 | 7/1985 | Furth | 236/20 R |

FOREIGN PATENT DOCUMENTS

| | | |
|---|---|---|
| 48494/85 | 4/1986 | Australia . |
| 48497/85 | 4/1986 | Australia . |
| 76124/87 | 2/1988 | Australia . |
| 32126/93 | 8/1993 | Australia . |
| 63379/94 | 1/1995 | Australia . |
| 0306235 | 3/1989 | European Pat. Off. . |
| 2403761 | 8/1975 | Germany . |

Primary Examiner—Harry B. Tanner
Attorney, Agent, or Firm—Sheridan Ross P. C.

[57] ABSTRACT

A heating and cooling system, particularly for water, provides advantages in safety, reliability and efficiency of temperature regulation systems for liquids. A temperature regulation unit is controlled by a controlling device. A sensing unit is relied upon to detect a particular liquid temperature and a safety unit enables the temperature regulation unit to be disabled. A reset device connectable to a power source via a transforming unit is adapted to lower the voltage level of the power source to a level safe for use by a user. The reset device is operable to reset the safety unit, thus enabling a controller unit to again operate the temperate regulation unit. In a preferred embodiment, the controller unit operates the temperature regulation unit through the safety unit, such that when the safety unit is activated, power cannot be transferred to the temperature regulation unit.

4 Claims, 2 Drawing Sheets

SOLAR HOT WATER HEATING SYSTEM

This is a divisional application of prior application U.S. application Ser. No. 08/718,531, filed on Oct. 10, 1996, U.S. Pat. No. 5,836,511, which is the National Stage of International Application No. PCT/AU95/00198, filed Apr. 7, 1995.

FIELD OF THE INVENTION

This invention relates to heating and cooling systems, especially water heating systems such as solar hot water systems and, more particularly, to improving the useability of such systems, and advantageously increasing the safety, reliability and efficiency of such systems.

BACKGROUND OF THE INVENTION

Solar hot water systems are capable of supplying hot water in a manner that is relatively cheaper than conventional electrical or gas fired systems. However, most systems of this type do not rely solely on solar heating and usually incorporate a separate booster system, in order to heat the water to the required temperature when prevailing conditions prohibit heating by solar power alone.

Largely due to regulatory provisions, such systems must include safety devices to operate in the event of some fault. For example, should a short circuit occur such that the controller does not disable the heating element, a safety switch is provided that will disable the heating element when a predetermined temperature is exceeded. A qualified electrician can then be called in to correct the fault and reset the system.

However, in some hot regions, it is common for water to be heated by the solar system to a temperature exceeding a predetermined safe level, such that a safety mechanism in the electrical heating system will trip out and disable the heating element. Such a safety mechanism generally operates only on the basis of sensed water temperature and does not allow differentiation between overheating due to solar heating and overheating due to a fault in the electrical system. For this reason, when a safety mechanism trips out, safety considerations have, to date, dictated that a qualified electrician check the system and, where appropriate, reset the system. That is, even if a safety mechanism trips out due to the prevailing conditions, and not due to an electrical fault, the average consumer is not able to reset the system and maintain a constant hot water supply. Rather a qualified electrician must be called, even if no electrical fault exists.

For this reason, hot water systems to date have been designed to facilitate the electrician's job and generally reset switches are located in the vicinity of solar heating equipment on the roof of a building incorporating the equipment.

This arrangement may be undesirable for the consumer. For example, where climatic conditions alone have caused overheating of the system, such that the safety mechanism has operated to disable the heating element, the safety mechanism has usually tripped out during daylight hours. This tripping is unlikely to be detected by the user until the system falls below the minimum operating temperature at which the electrical heating system must be utilised to maintain the system operating temperature. This may not be detected until the following evening and could result in the system, not re-heating to operating temperature. It is at this point, when the water is no longer at the operating temperature, that the qualified electrician is called. There is then a further delay until the electrician is able to reset the system, which causes the water temperature to fall further, and thereby increases the time delay until the water is again at the desired operating temperature.

This is a particular problem in isolated locations, such as the outback of Australia, where a qualified electrician is neither nearby or easily accessible.

This type of problem is not only restricted to solar hot water systems. In electric storage systems, it is common for the safety circuit to trip out due to a fault on the electricity supply line or some other fault unrelated to the electric heating circuit. Such a fault may, for example, be a power surge or a spike. With the increased use of sophisticated electronic safety switches power surges and spikes cause false tripping to be a regular problem. As with the solar hot water systems, these false trips prevent the hot water system from supplying water at operating temperature. They also decrease energy efficiency due to the cooling of already heated water, requiring re-heating and additional energy costs.

Further, with the increasing need to improve the efficiency of energy utilisation comes the need to improve the efficiency of the manner in which hot water systems attain their operating temperature when required.

Commonly, hot water systems maintain the water at the required operating temperature during periods when the demand for hot water is minimal. They use a simple thermostat device that cycles a heater on and off, thereby maintaining the water at the desired operating temperatures. This is inherently inefficient both from an economic and an energy view point, especially during peak electricity demand times.

One manner of dealing with this efficiency problem has been to utilise off-peak electricity, although this may not always be available. However, this can be inconvenient in that the user is strictly tied to off-peak electricity demand times and this is often inappropriate or inconvenient to the user, depending on their particular circumstances.

Another way in which these efficiency issues have been addressed has been to use solar hot water systems. However, these systems also have their drawbacks.

During winter, the periods of sunlight may be insufficient to heat the water to operating temperatures, leaving the system unable to supply water at the desired temperature when required.

To overcome this problem, solar hot water systems use booster heaters and, as in the case of electrical hot water systems, this system can be expensive in that external power is required and inefficient in that water is maintained at a high operating temperature during periods when not essential.

These systems have further drawbacks as it is common for the systems to be maintained below operating temperature. This problem arises because the electrical heating system and the solar heating system are independent.

It is therefore an object of the present invention to provide a system to allow non qualified persons to reset hot water systems when non electrical faults have occurred.

It is also a further object of the present invention to provide a hot water supply system which efficiently and reliably supplies hot water operating temperature only when it is required.

SUMMARY OF THE INVENTION

With the above object in view, the present invention provides a liquid temperature regulation system comprising:
 a controller means being adapted to control operation of
  a temperature regulation means; a sensing means to
  detect the liquid temperature; a safety means to enable
  the temperature regulation means to be disabled; and a reset means connectable to the power source via a transforming means adapted to lower the voltage level of the power source to a level safe for use by a user; the reset means being operable to reset the safety means to enable the controller means to again operate the temperature regulation means.

Conveniently, the controller operates the temperature regulation means through the safety means, such that if the safety means is activated power cannot be passed through to the temperature regulation means.

Conveniently also, a sensing means for detecting the liquid temperature is provided, the sensing means providing temperature readings to the controller, such that the controller then operates the temperature regulation means in response to the current temperature of the liquid. The sensing means can also be connected to the safety means to enable the system to be disabled when a fault is detected.

Preferably the reset means is located in a position that is both convenient and easily accessible to the user, and is capable of resetting the system whenever a nonelectrical fault has caused the safety means to activate.

In a further preferred aspect, the present invention provides a liquid temperature regulation system comprising:

(a) a liquid storage means;

(b) a temperature regulation means to regulate the temperature of liquid in said liquid storage means;

(c) a temperature sensor to sense the temperature of liquid in said liquid storage means;

(d) a controller which controls the operation of the temperature regulation means in accordance with a temperature sensed by said temperature sensor; and (e) a safety element having an operational and an alarm condition which on activation causes cessation of operation of the temperature regulation means until said safety element is reset to operational condition by a reset means, wherein said reset means is connected to said safety element by low voltage electricity supply means operating at a safe voltage level thereby enabling reset, by a user, of said system on return of said safety element to an operational condition.

The safety element would generally be activated when the difference between actual and required liquid temperature exceeds a permissible limit. However, the safety element could be activated by other events such as the required liquid temperature falling below a permissible limit, or alternatively, power fluctuations or the like.

By "safe" is meant a voltage level which is considered by regulatory authorities in the country or State of use, as being non-hazardous to human health under normal conditions and is generally accepted as being less than 24 volts.

By "user" is meant a person, who is not necessarily qualified as an electrician, who may legally reset the temperature regulation system in accordance with the invention.

Preferably, the low voltage electricity supply means is operated at a voltage less than or equal to 24 volts and the temperature regulation system is supplied with electricity at mains voltage, i.e 240 volts and 50 Hz in Australia. Other voltage systems are not precluded from the scope of the present invention.

Conveniently, the reset means is located in a position convenient and accessible to the user.

Conventionally, the temperature regulation means may comprise an electrical heater, possibly as booster heater, having a heating element which is supplied with power at mains voltage. The control system for such a heating element also operates at mains voltage and therefore qualified electrical personnel are required to reset the system if any problems arise.

However, references in this specification to heating systems are not intended to limit the applicability of the invention to heating systems, especially those for heating water for household requirements. Analogous to electrical heating systems are electrical cooling systems which may, for example, operate by pumping a refrigerant in heat transfer contact with liquid to be cooled, for example water. The invention is equally applicable to these types of temperature regulation means.

An advantage of the present invention is that the householder can reset the water heating system if the system is in a safe condition. If the system is not in a safe condition, the householder will not be able to reset the system and an electrician may be called. In this regard, safety devices that disconnect power from the temperature regulation means in the event of an ongoing fault may also be activated to prevent operation of the system until checked by a qualified electrician.

In a further preferred aspect, the invention provides a water storage system to deliver liquid at an operating temperature at a preset time set by a user of the system comprising:

(a) a liquid storage means;

(b) a temperature regulation means;

(c) a temperature sensor to sense the temperature of liquid in said liquid storage means; and (d) a controller which controls the operation of the temperature regulation means in accordance with a temperature sensed by said temperature sensor, wherein said controller energises said temperature regulation means at a time prior to said preset time, at which said liquid is to be demanded at said operating temperature, sufficient that said liquid reaches operating temperature at said preset time.

Conveniently, the system is a water heating or cooling system and the user a householder who sets the time at which water is required at the operating temperature. The controller is preferably a multi-channel microprocessor device that allows a plurality of times or time bands to be set by the user. The controller may be located to be readily accessible by the user.

In one preferred embodiment, the controller has two channels, one of which accords with a morning peak and the other of which accords with an evening peak. However, for cases such as hotels and other facilities that may have a number of peak demands during the day, for example according with breakfast, lunch and dinner times, the system of the invention may be adapted to accommodate this.

It is to be understood that present liquid temperature regulation systems are not designed to deliver liquids, especially water, at operating temperature in the above manner. Water heating systems, in particular tend to continually reheat water which falls below operating temperature. This is wasteful of energy. Therefore, economies in electricity usage are expected from the systems of the invention.

It is also to be understood that the present invention is equally applicable to gas operated systems such as gas fired or gas refrigerated systems, whereby the controller controls operation of the system, typically the pilot flame, such that the water can be heated in a similar fashion to that of electrical heaters.

DETAILED DESCRIPTION OF THE INVENTION

The present invention will be better understood from the following description of a preferred embodiment thereof, made with reference to the accompanying drawings. The description is non-limitative and analogies with the heating or cooling of other liquids will be readily apparent to those skilled in the art after reading this description.

Figure 1:
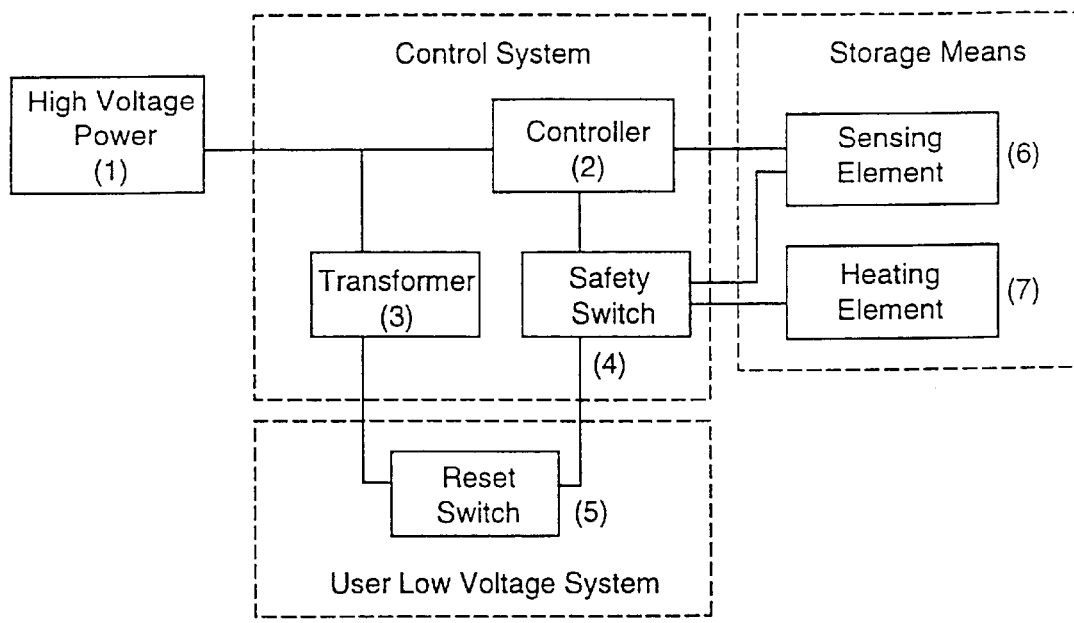
FIG. 1 is a flow diagram showing the main components of the present invention.

Referring generally to FIG. 1, it is desired to maintain the temperature of a liquid, such as water, at a desired value in some storage means, or tank. A heating element (7) is provided, so that when power is supplied from the controller (2), the heating element (7) increases the temperature of the water. A sensing element (6) is located so as to determine the current water temperature. Data from the sensing element (6) is passed to both the controller (2) and the safety switch (4). The controller (2) in response to the current temperature provided by the sensing element (6), actuates the heating element (7) to provide sufficient heat to achieve and maintain the desired temperature. The controller (2) is powered by a high voltage power source (1), conveniently mains power, which is usually considered hazardous to human health, if improperly used. Preferably located between the controller (2) and heating element (7) is a safety switch (4) capable of disabling the heating element (7) should the temperature detected by the sensing element (6) exceed some predetermined value, or alternatively fall below some predetermined value. In order to allow easy resetting of the system in the event of generally harmless non-electrical faults, a reset switch (5) is provided which is preferably accessible to the user who may reset the safety switch (4) so that the controller (2) is again able to operate the heating element (7), as required, in response to temperature fluctuations. For the reset switch (5) to be used by non qualified persons, it is ideally to be placed in a non hazardous environment. The reset switch (5) is therefore connected to the power source (1) via a transformer (3), or some other means of power regulation. The transformer (3) converts the power from the high voltage power source (1) into a low voltage suitable for use by non qualified persons. It is this low voltage which powers the reset switch (5). The reset switch (5) can therefore be placed in a location convenient to the user. If the safety switch (4) has disabled the heating element (7), and no electrical fault has occurred, the user is able to activate the reset switch (5) which resets the safety switch (4), allowing the controller (2) to again control the heating element (7) in response to the temperature determined by the sensing element (6). If an electrical fault has occurred which causes the safety switch (4) to activate, the system may be designed so that use of the reset switch (5) by the user has no effect. In this circumstance, a qualified electrician may be called to address the problem.

Figure 2:
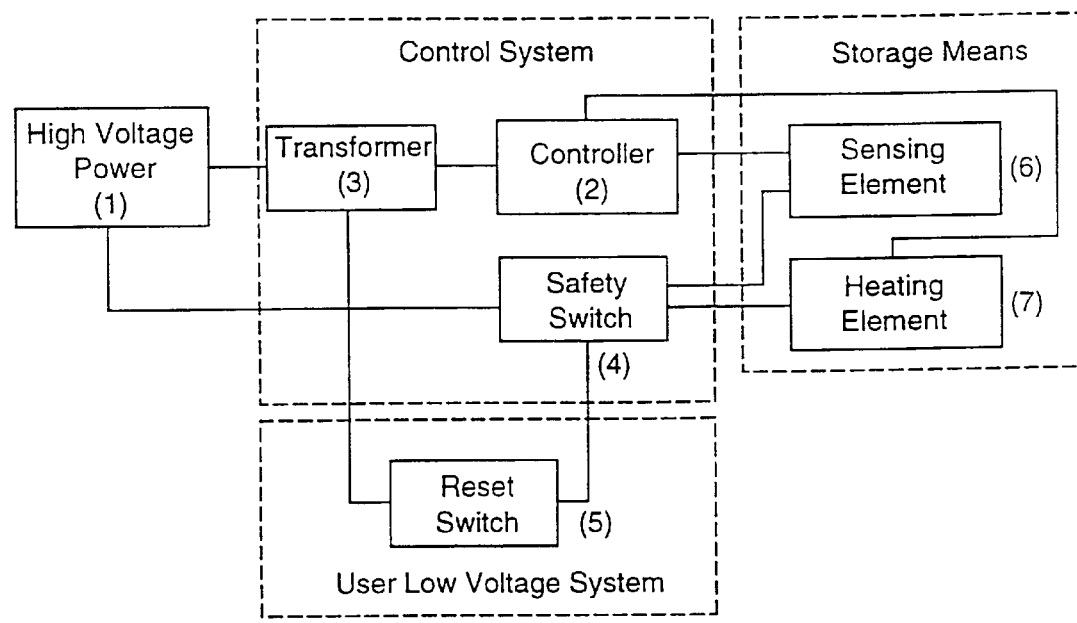
FIG. 2 is an alternative embodiment of the present invention.

It will be appreciated that the system may be constructed in a number of different configurations, and still maintain the reset means in a low voltage circuit to enable the user to safely reactivate the system. FIG. 2 is an example of such an alternative configuration, whereby the controller (2) is also run off a low voltage line, as required by regulations in some jurisdictions, and is also directly coupled to the heating element (7), and not via the safety switch (4).

In this configuration if the safety switch (4) is activated, the controller (2) will still be able to send signals to the heating element (7), however, the heating element (7) will not be able to operate as the safety switch (4) will have disabled the heating element (7) from the power source (1).

Figure 3:
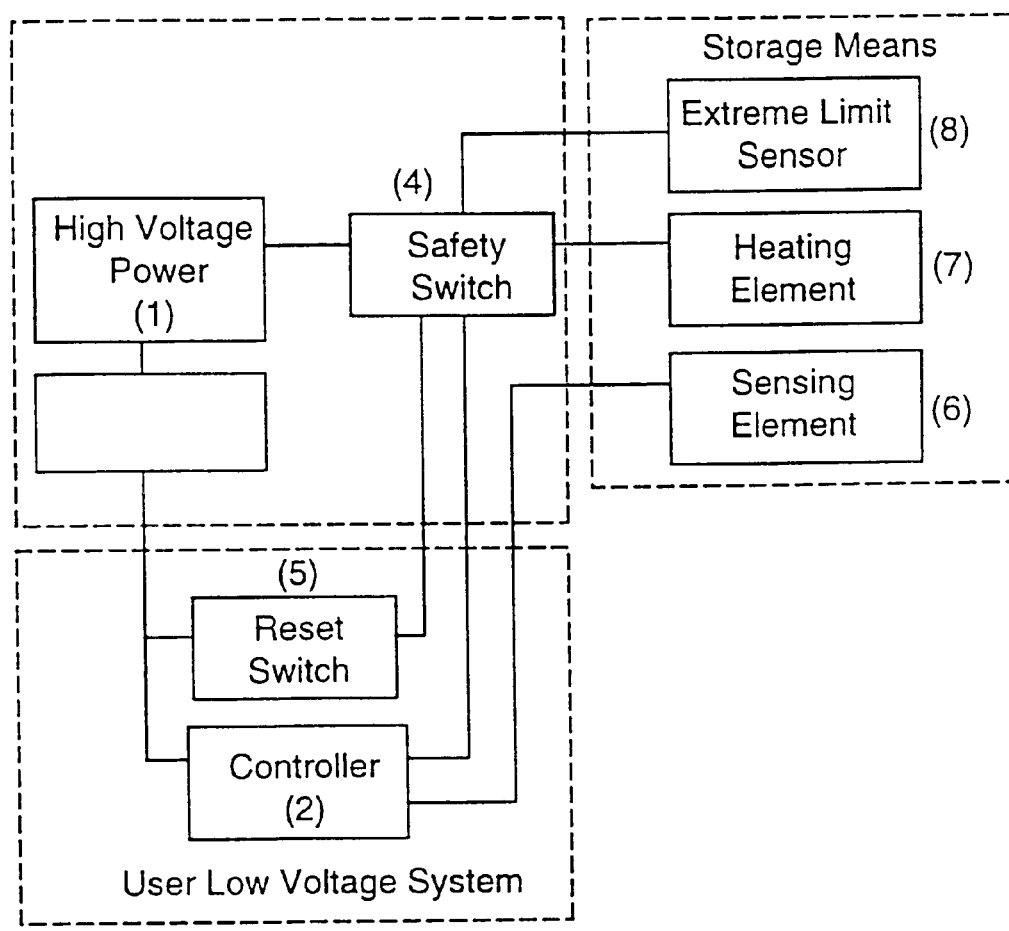
FIG. 3 is a further embodiment of the present invention.

FIG. 3 is yet another configuration showing the controller (2) explicitly in the user low voltage system. The controller (2) of FIG. 3 controls operation of the heating element (7) in response to the temperature detected by the sensing element (6), however, at least one further extreme limit sensor (8) is also provided. The extreme limit sensor (8) may be a high limit sensor, a single high or low sensor, or alternatively two sensors may be provided, one to sense a high limit and the other to sense a low limit. In such a configuration the extreme limit sensor (8) is set to activate the safety switch (4) is response to some preset extreme temperature value, which generally indicates a fault. If the system is operating correctly, the water or other liquid temperature, will be maintained in a predetermined temperature range by the controller (2) in response to the sensing element (6), and will not cause the extreme limit sensor (8) to activate the safety switch (4).

More specifically, either of the configurations include a booster electrical heater element (7), as temperature regulation means, which is typically supplied with mains, i.e 240 volts in Australia, voltage electricity (1). Heat input to the water varies, in the case of a resistance heater element (7), with the current supplied to the heater, which in turn is controlled by a safe voltage cutoff switch (4) in accordance with temperature sensed by a temperature sensor located to sense temperature of water within a water storage means. Desirably, water is to be supplied from the water storage means at an operating (or set-point temperature). Thus, generally speaking, when the water set point temperature is reached no, or limited power to maintain set-point, is supplied to the heater element (7). When the temperature sensor (6) shows a temperature below set-point, power is accordingly delivered to the booster heater element (7) to heat water within the water storage means to the set point temperature. A controller (2) establishes the foregoing control loop.

The booster heater element (7) is expected to be of immersion resistance type though this is not essential and a jacket or any suitable booster heater element could be employed. The nature of the booster heater element (7) is not critical to the present invention.

Similarly, the nature of the overall heating system is not critical. The present embodiment relates to a hybrid solar/electrical heating system as well known to those in the art. However, a pure electrical heating system could equally well be employed.

When the temperature sensor (6) detects that water in the water storage system has reached an excessive temperature, i.e a high limit cut-out temperature $T_h$, an automatic cut-out or switch, as safety element (4), for example of conventional bimetallic strip type, is actuated. In this type of switch (4), contact is broken when the water temperature exceeds a particular value, say $T_h$=60° C. On actuation, the control circuit (2), which ensures normal operation of the booster heater element (7), is broken and the booster heater element (7) deactivated. In conventional systems, it is this breakage of the circuit which requires resetting, under safe conditions, of the control system (2) by a qualified electrician. Moreover, because the control system of a conventional system is operated at mains voltage it is highly dangerous for unskilled personnel to attend to such resetting.

On the other hand, in the system illustrated, there is incorporated a transformer (3) between the mains power (1) supply for the booster heater and the reset switch (5). This transformer (3) is of conventional step-down type and allows the booster heater reset means (5) to operate at a maximum voltage of 24 volts and preferably lower. Therefore, the cut-out safety element reset means (5) described above is incorporated in a low voltage circuit unlike conventional systems. This opens the way for non-qualified personnel, such as householders, to reset the system, since such personnel are not exposed to dangerous high voltage electricity.

The reset means (5) can be conveniently embodied in a push-button relay system which, on actuation, will enable resetting of the safety element (4) when the automatic cut-out has reset to close the control circuit (2). Attempting to reset the system at other times will meet with failure to return the water heating system to operational condition. This reset button is conveniently located in a control panel or module and the user is alerted to the necessity and ability to reset by a fault indicator such as a light. A fault light may illuminate with a specified colour which may, for example, be red when no reset is possible or green when reset is possible.

The control module may also display current water temperature $T_w$, automatic cut-out set point and mode of operation, for example, the preferred embodiment incorporates manual, automatic and off operating modes, enabling the user to set real time heating rates but, normally, automatic mode would be preferred with pre-programming of the controller (2) by the installer of a desired heating programme. Ideally, the controller (2) includes a microprocessor configured with at least two channels to enable desired operating temperatures for water at at least two different times or time bands. Once the time or time band has been set, the controller (2) is configured to enable booster heating to automatically commence at a calculated time $t_s$ sufficiently prior to the desired preset time $t_p$ to enable delivery of water at operating temperature $T_d$ at the preset time $t_p$. System parameters such as system capacity C, and heating input $Q_h$ at varying load of the heater element (7) are fed into the controller (2) together with the water temperature at commencement of heating $T_c$. The system may be provided with a memory for this purpose and can function in an adaptive manner.

The simple form of the control algorithm for setting the commencement time, assuming zero water demand during preheating, is as follows:

$$t_s = t_p - \frac{C(C_{p,water})(T_d - T_c)}{Q_h} \qquad (1)$$

where $C_{p,water}$ is the heat capacity of water.

It is to be understood that the temperature at commencement, $T_c$, which is the temperature at heating start time, may be seasonably and climatically variable. This value can, however, be estimated from mean temperature data or even, in more sophisticated controllers, from data logged the previous day. With such sophistication however comes cost, and in a case where satisfactory operating temperature covers a relatively large temperature range, is not absolutely necessary. Alternatively, $T_c$, may be maintained at a rest level independent of climatic/seasonal variation by low level boost heater input during the night, for example. The other corrections that might be made are for losses by evaporation from the water storage means or volume changes during the preheating period. These can be estimated from typical data available to the installer.

Although, the above characteristics of the control system must typically be incorporated within the controller (2), the actual controller type is not in itself important and various microprocessor controllers are available that can be configured to operate as above.

The controller (2) may also incorporate a cost function such that boost heat is supplied in accordance with a user's desired budget allowing for further economy. The controller (2) is designed to incorporate each of the above functions.

As an additional safety feature, the temperature sensor controller can be programmed to only operate between certain limits, say for example 10° C. and 65° C. If the sensor (6) reads a temperature outside of this range then the controller will automatically shut the electric booster element (7) off, and indicate a sensor fault. During normal operation, the temperature range would not be exceeded and hence a fault would not be registered.

The control module, which incorporates the controller (2) and the visible displays of time, temperature, fault status and cost, may be placed at a convenient location within or outside the building. Conveniently, the control panel is located inside the building and, in this regard, the simple nature of the control panel avoids the undesirable roof-top location conventionally used.

The above embodiment is directed to a water heating system but the invention is not so limited. The invention is equally applicable to water cooling systems or, indeed, systems for heating or cooling any other type of liquid, whether electrical or gas generated.

The claims defining the invention are as follows:

I claim:

1. A water storage system to deliver liquid at an operating temperature at a preset time set by a user of the system comprising:

(a) a liquid storage means;

(b) a temperature regulation means;

(c) a temperature sensor to sense the temperature of liquid in said liquid storage means; and (d) a controller which controls the operation of said temperature regulation means in accordance with a temperature sensed by said temperature sensor, wherein said controller energises said temperature regulation means at a time prior to said preset time, at which said liquid is to be demanded at said operating temperature, sufficient that said liquid reaches operating temperature at said preset time.

2. A system as claimed in claim 1, wherein said controller is adapted to enable a plurality of preset times to be included.

3. A liquid storage system to deliver liquid at an operating temperature at a preset time set by a user of the system comprising:

a liquid storage means;

a temperature regulation means;

a controller means being adapted to control operation of said temperature regulation means;

a sensing means to detect a liquid temperature in said liquid storage means;

a safety means to enable said temperature regulation means to be disabled; and a reset means coupled to a power source via a transforming means and adapted to lower a voltage level of said power source to a level safe for use by the user;

said reset means being operable to reset said safety means to enable said controller means to again operate said temperature regulation means;

wherein said controller means energizes said temperature regulation means at a time prior to said preset time, at which liquid is to be demanded at said operating temperature, sufficient such that said liquid reaches operating temperature at said preset time.

4. A liquid storage system to deliver liquid at an operating temperature at a preset time set by a user of the system comprising:

a liquid storage container;

a temperature regulator;

a controller being adapted to control operation of said temperature regulator;

a sensor to detect a liquid temperature in said liquid storage container;

a safety mechanism which disables said temperature regulator; and a reset mechanism coupled to a power source and a transformer and adapted to lower a voltage level of said power source to a level safe for use by the user;

said reset mechanism being operable to reset said safety mechanism to enable said controller to again operate said temperature regulator;

wherein said controller energizes said temperature regulator at a time prior to said preset time, at which liquid is to be demanded at said operating temperature, sufficient such that said liquid reaches operating temperature at said preset time.

* * * * *